Figure 1:
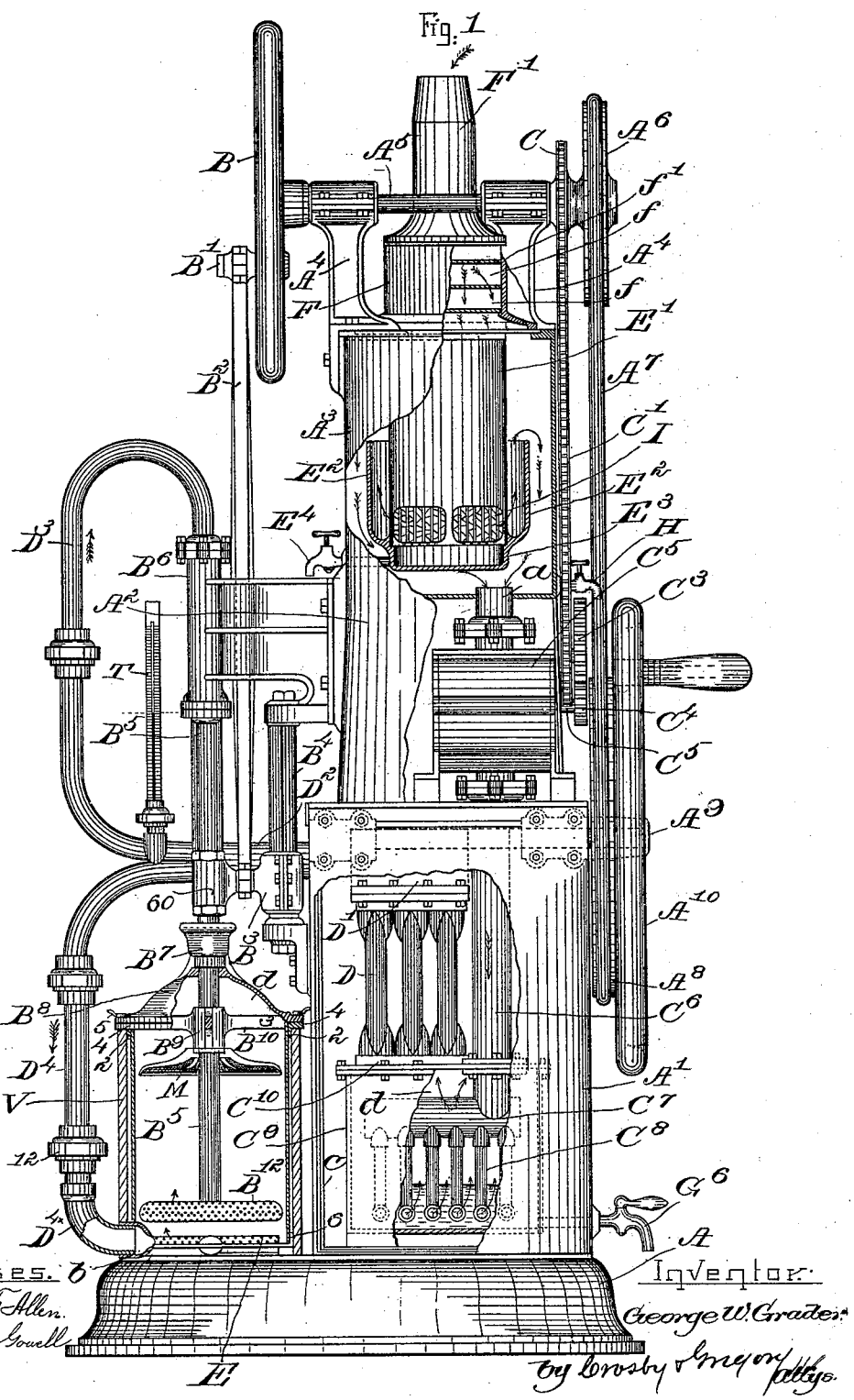

(No Model.) 3 Sheets—Sheet 1.

G. W. GRADER.
APPARATUS FOR TREATING MILK OR CREAM AND PRODUCING BUTTER.

No. 498,646. Patented May 30, 1893.

Witnesses.
Edward F. Allen.
Louis N. Gowell.

Inventor:
George W. Grader
by Crosby & Gregory
attys.

(No Model.) 3 Sheets—Sheet 2.
G. W. GRADER.
APPARATUS FOR TREATING MILK OR CREAM AND PRODUCING BUTTER.
No. 498,646. Patented May 30, 1893.
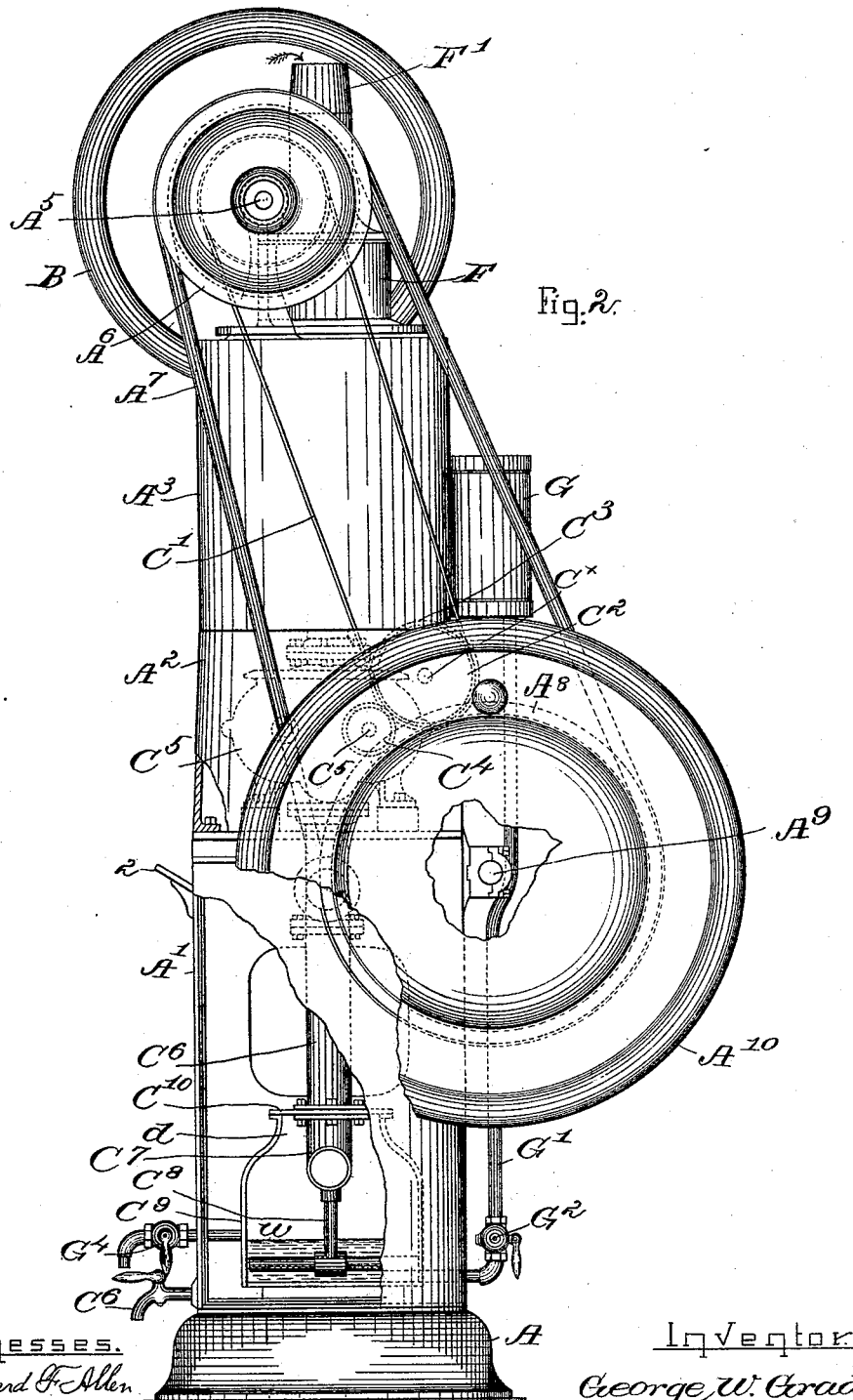

(No Model.) 3 Sheets—Sheet 3.
G. W. GRADER.
APPARATUS FOR TREATING MILK OR CREAM AND PRODUCING BUTTER.
No. 498,646. Patented May 30, 1893.
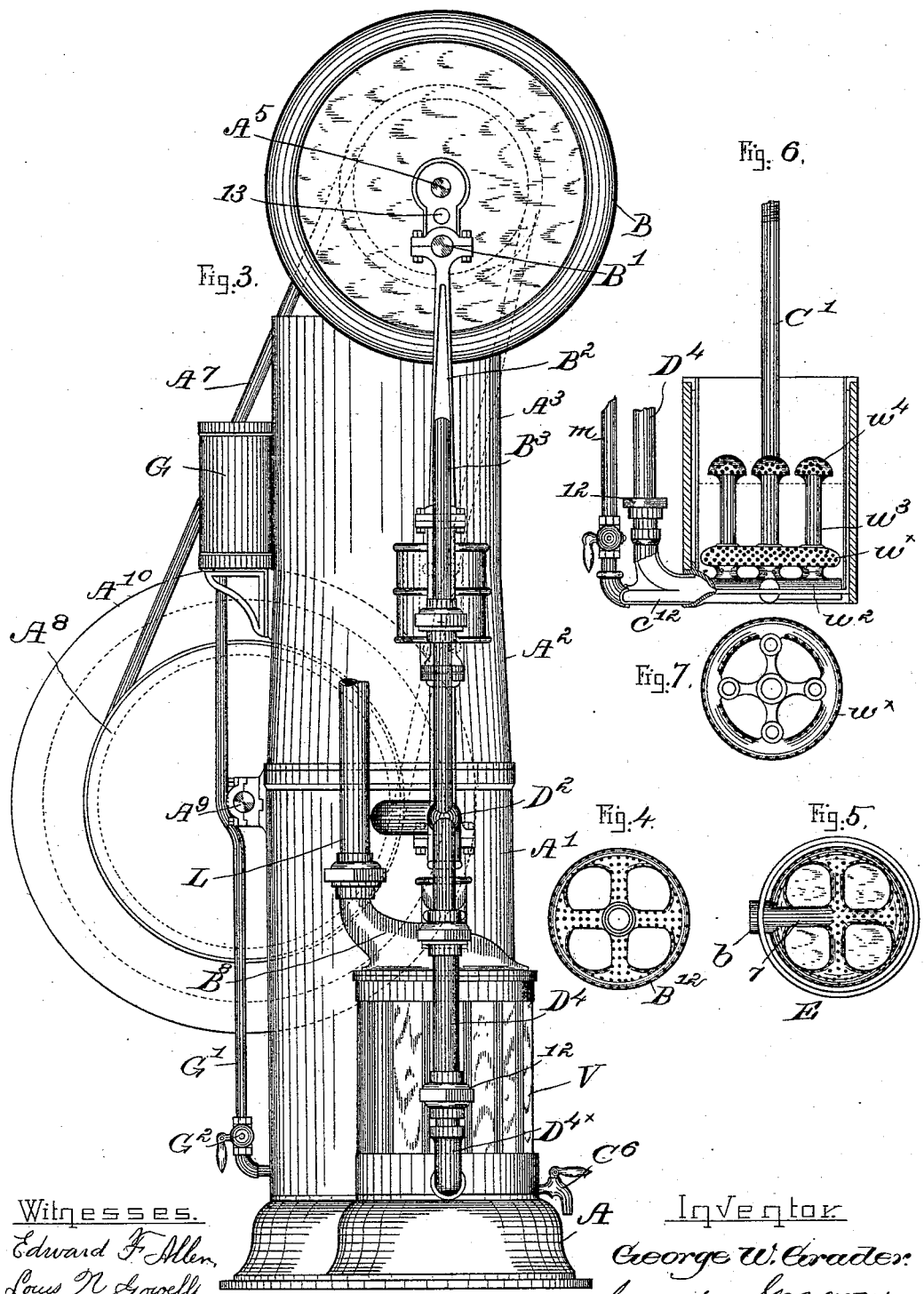

UNITED STATES PATENT OFFICE.

GEORGE W. GRADER, OF MARBLEHEAD, MASSACHUSETTS.

APPARATUS FOR TREATING MILK OR CREAM AND PRODUCING BUTTER.

SPECIFICATION forming part of Letters Patent No. 498,646, dated May 30, 1893.

Application filed December 28, 1891. Serial No. 416,300. (No model.)

*To all whom it may concern:*

Be it known that I, GEORGE W. GRADER, of Marblehead, county of Essex, State of Massachusetts, have invented an Improvement in Apparatus for the Treatment of Milk or Cream and the Production of Butter, of which the following description, in connection with the accompanying drawings, is a specification, like letters and figures on the drawings representing like parts.

This invention has for its object the production of a novel apparatus for the production of butter from milk or cream, and in a novel manner.

In accordance with my novel method of making butter the milk or cream used is placed in a milk receiver where it is agitated by a movable air distributing dasher, and air cooled by direct contact with ice to remove its floating particles, or washed by being blown or forced through a liquid, is distributed finely in the milk or cream, the said air itself purified before entering the milk or cream purifying the latter making butter free from all impurities. Butter made in accordance with my method will keep longer than when made by other methods known to me. For the best results, I also prefer to and do filter the air entering the ice tank. In ordinary summer weather the milk or cream has to be cooled to bring it to the proper temperature for butter making, so I have provided my improved apparatus with cooling sections located inside of jackets; the cooling sections being preferably packed in ice and salt, except for the coolest weather. The air is washed in water in a wash box, and this water if desired, may contain in solution, lime or some other alkali, deodorizer, or disinfectant. Among all the food products used by man none is more susceptible to take up impurities from the atmosphere or surrounding objects, than milk, and air simply cooled and discharged into the milk takes into the milk the impurities of the air. This invention goes beyond the introduction of cooled air, and provides for washing the air and also cooling it by contact with ice, and thereafter impregnating the washed air with a purifying, deodorizing or disinfecting substance, by passing said air through a bath containing the substance used, as for instance lime. By absolutely purifying and disinfecting the air forced into and distributed by the dasher throughout the cream in the vessel holding the same, so that all the particles thereof are subjected to the action of the air, the butter milk left after churning is so purified that it is equal in sweetness to, and more wholesome than, much of the sweet milk commonly sold by milk dealers. Drawing air intermittingly a little at a time over ice and then forcing the air against the top surface of a body of milk, in a churn would not effect such a commingling of air and milk as would carry away from the latter the impure air and odoriferous bodies commonly found therein.

Figure 1, in front elevation partially broken out, shows a butter making apparatus, embodying my invention; Fig. 2, a right-hand side elevation partially broken out; Fig. 3, a left-hand side elevation. Fig. 4, shows the air distributing dasher; Fig. 5, the air distributing bottom plate. Fig. 6, shows a purifying cylinder which may be substituted for the vessel containing the milk or cream to be churned, to thus adapt the same machine for the purification of milk or cream, and Fig. 7, shows the air distributing dasher used in the cylinder shown in Fig. 6.

The base A has erected upon it shells or curbs $A'$, $A^2$, $A^3$, suitably connected together, and a churn body or vessel V. The curb $A^3$ has stands $A^4$ provided with suitable bearings for the main shaft $A^5$ having a pulley $A^6$ driven by a band $A^7$, or otherwise, from some motor device, herein shown as a pulley $A^8$, on a shaft $A^9$ having a pulley or wheel $A^{10}$, driven by some suitable power.

The main shaft has a wheel B, provided with a crank pin $B'$ which, by a connecting rod $B^2$ is jointed to a cross-head $B^3$ fitted to be reciprocated on a guide $B^4$, the portion 60 of the cross-head being hollow and provided at bottom and top with screw-threads into which are screwed two pipes constituting a hollow piston rod $B^5$, the upper part of which is extended into an air chamber $B^6$ through a suitable stuffing box at one end thereof. The lower part of the piston rod passes through a guide cup $B^7$, shown as forming part of a dome or cover $B^8$ for the churn, and through the hub $B^9$ of a spider $B^{10}$, and at its lower end has attached to it an air distributing dasher $B^{12}$, shown as a metal shell, see Fig. 4, having a series of holes, preferably fine holes.

The churn is composed as shown, of a metallic inner body or wall, see Fig. 1, soldered or secured at its upper end to a downwardly extended flange 2 of the said spider $B^{10}$, the latter consisting of said hub $B^9$, and a series of radiating arms or spokes 3 attached at their outer ends to a ring 4 having the said flange 2 at its underside. The flanged foot of the cover $B^8$ is connected by bolts 5 with the ring 4. The lower end of the side wall of the churn is in like manner soldered or secured to a flange 6 forming part of the perforated bottom piece E of the churn. The shape of this bottom piece is best shown in Figs. 1 and 5, it resembling a wheel having four spokes, and a rim, three of the spokes being shown as perforated. One of the spokes marked 7 has an open mouth $b$, which receives the delivery end of a pipe $D^{4\times}$, joined by a union 12 to an air pipe $D^4$. The metallic body of the churn is shown as surrounded by wooden lagging, as is preferable but not necessary. To remove the churn, unscrew the union 12, remove the bolts 5, and unscrew the piston rod and cross-head.

The main shaft has, as shown, a sprocket-wheel C which drives a sprocket-chain or equivalent belt C', extended over a sprocket-wheel $C^2$, shown by dotted lines Fig. 2, fast on a shaft $C^\times$, provided with a suitable gear $C^3$ which engages a pinion $C^4$ on a shaft of a blower $C^5$ of usual construction, and shown as located inside the curb $A^2$, and as having its inlet $a$ extended inside the curb $A^3$, as best shown in Fig. 1. The outlet pipe $C^6$ from the blower is coupled to a header $C^7$ having connected to it a series of air-distributing pipes $C^8$, portions of which are provided preferably at their lower sides, as in Fig. 2, with a series of holes, the perforated portions of the said pipes $C^8$ being immersed in the water or liquid shown by $w$ in the wash box $C^9$, closed at its top by a head or plate $C^{10}$, to thus leave above the water level an air chamber, the plate $C^{10}$ being also shown as extended between the pipe $C^6$ and the said header, a hole being made in the plate in line with the pipe $C^6$. This head or plate $C^{10}$ has also connected to it in suitable manner the lower ends of a series of air-conducting pipes D, the upper ends of which are connected in suitable manner with a second header D', to which in turn is connected the air pipe $D^2$. The pipes D and header D' constitute an air cooling device, as in practice, especially in warm weather, the said pipes and the wash box inside the curb A' will be packed outside with ice and salt. The air pipe $D^2$ is bifurcated or made as two branches outside the curb A', see Fig. 1, one branch being coupled by a pipe $D^3$ with and to supply purified air to the air chamber $B^6$, and the piston rod therein and its connected dasher $B^{12}$, while the other branch supplies purified air to the pipe $D^4$, $D^{4\times}$, the mouth of the latter, see Fig. 1, entering the neck $b$ of the air distributing bottom plate.

The curb $A^3$ has suspended or placed within it an ice-tank E' having a jacket $E^2$ up and out through which may pass the air drawn through the ice-tank as represented by the arrows, Fig. 1, the lower end of the ice-tank having a drip-pan $E^3$ provided with a cock $E^4$ for waste water from melting ice. The ice used to fill the ice-tank will preferably be crushed fine.

The ice-tank is surmounted by a filter F containing layers $f$ of lint-cotton separated by layers of wire-gauze $f'$, or some equivalent separating plates. The filter has inserted into its upper end the end of an air supply pipe F' which may be of such length and shape as to take outdoor air from any desired point.

G represents a tank in which, in the presence of water, may be placed lime or other chemical with which it is desired to treat the cooled and purified air, and G' is a pipe to conduct the chemically treated water into the wash-box, the said pipe having a cock $G^2$ by which to regulate the quantity of water admitted to the wash-box, a pipe having a cock $G^4$ being connected with the wash-box to let the water escape if above a certain point in the said box.

The cock H permits the escape of water from the curb $A^3$ in case any gets therein by accident, thus preventing water entering the blower inlet $a$.

In butter making the temperature of the milk or cream must be at about a certain point, say 68°, and to enable the operator to know the degree of cold, I have provided the apparatus with a thermometer, T. In very cold weather, instead of salt and ice in the curb A', I may use warm water. The curb A' is lined with a copper or metal lining $c$. The cock $G^6$ enables water to be drawn from the curb A', as required. The top-plate or cover $B^8$ has attached to it an impure air discharge pipe L which may be extended outside the building in which the apparatus is used. The spider $B^{10}$ sustains a foraminous shield or reacting atomizer M. Milk or cream, or both, having been put into the churn or vessel V, ice into the ice-tank, and water into the wash box $C^9$, the machine may be started. The blower in its rotation draws air through the filter which removes from the air most of its floating particles, and the air thus partially purified is made to pass through the ice-tank in contact with the ice therein, which causes the remaining portions of the floating particles of the air to be left behind, and the ice by melting gradually, constantly presents a clear fresh surface to the incoming air. The air robbed of its floating particles and cooled more or less by the ice with which it was in contact, is drawn into the blower and forced by it through the pipe $C^6$ into and out of the air distributing pipes $C^8$ immersed in the liquid in the wash box,—said air, rising through the said liquid,—and impregnated or saturated with lime or other chemical held in solution in the liquid, if a chemical is used,— rising in the air chamber $d$, see Fig. 1, and entering the pipes D and $D^2$ and thence through pipes $D^3$, and into the air chamber $B^6$, hollow piston rod B and distributing dasher, and also through the pipes $D^4$, $D^{4\times}$ into the bottom plate E. Clear pure water may be used in the wash-box. While the blower acts to supply the churn or vessel V and dasher with purified air, cooled more or less by its passage through the pipe D, the wheel B, through the connecting rod $B^2$, causes the piston rod and its attached dasher to be reciprocated in the said churn or vessel V, thus agitating the milk or cream therein, the dasher at the same time distributing purified air through the outlets of the churn or vessel.

While I prefer for the best results to use both the ice-tank and the wash-box, yet I desire it to be understood that prior to my invention I am not aware that any one has ever devised such a plan or system as hereinafter described of removing by moisture or water, the floating particles from air to enter milk or cream in its treatment for food purposes, and consequently I get good and improved results in a sanitary respect by the use of either the ice-tank, or the wash-box to the exclusion of the other, but it is preferred to use both; and that the water in the wash-box contain in solution a chemical having purifying, deodorizing, or disinfecting properties, the material used and its quantity not being deleterious to the health of the person using the butter produced. Butter produced in this way will be sweeter and will not turn or become rancid and sour as butter made in other ways known to me.

In operation the dasher shown has a long stroke, or reciprocates and in its movements the air forced through the dasher and also the air forced through the bottom plate E enters and is thoroughly commingled with the globules of milk or cream, and all parts of the milk and cream are acted upon by the air so that any impure gaseous matter in the milk or cream is absorbed by the air and carried with it away through the impure air discharge pipe L. I prefer to use the return atomizer as it aids in breaking up the cream globules, but good results can be obtained without its use.

It is not intended to limit this invention to the exact devices shown for introducing purified, cooled and washed air into the mass of milk or cream; or purified and cooled air therein; nor to the exact shape of the curb or ice-tank; or wash-box and air distributing pipes therein; as the same may be variously modified without departing from the principle and scope of my invention.

The cocks $G^2$ and $G^4$ may be left opened just far enough to keep the supply of liquid in the wash-box up to the standard of efficiency or purity.

In Fig. 6 I have shown a vessel externally like the churn body described. This vessel has however a bottom piece $w^2$, a dasher $w^\times$, guide tubes $w^3$, atomizers $w^4$, and hollow piston rod $C'$. The said vessel is just the same in construction as the purifying cylinder described in my application Serial No. 416,299 it showing and claiming the said devices in an apparatus for purifying milk or cream. I have herein shown the said parts merely to show that they may if desired be substituted for the churn or vessel V, shown in Fig. 1, and in such event, the amalgamator $C^{12}$ will be attached to the straight part of the pipe $D^4$ by the union 12, thus converting the churn into a milk or cream purifier, the pin at the upper end of the connecting rod being however removed from its positions Figs. 1 and 3 into the hole 3, so as to give the dasher $w^\times$ a shorter throw. Some of the other parts herein shown are also represented in my application Serial No. 416,299 for improvement in apparatus for purifying milk, but herein the said parts are employed in combination with a vessel containing milk or cream for the production of butter.

In case it is desired to make the churn of large capacity for large dairies, I may increase the number of cooling devices or enlarge the same as represented in my said application.

I am aware prior to my invention that for the purposes of forming butter, air cooled more or less has been forced into the milk or cream, but I am not aware that the air has ever been purified in manner herein provided for, and it is this purification of the air which renders my invention of great value, for in the production of butter no outside contamination or floating germs contained in the atmosphere or otherwise are introduced into the milk or cream.

I have herein represented the dasher as connected with a hollow piston, but I desire it to be understood that instead of the particular hollow dasher, herein shown, I may use a dasher shaped externally in any usual manner, providing the same, however, with means for receiving and discharging air into the milk or cream; and the said dasher may have movement imparted to it in the milk or cream in the vessel in any usual manner, and by any usual means.

I consider as within the scope of my invention the employment of any equivalent for the dasher whereby the purified air may be distributed into and through the body of the milk or cream, or in other words, the dasher constitutes an air distributing device.

In the form in which I have herein embodied my invention, the air is brought in direct contact with the ice before entering the wash box, but it is obvious that this process might be reversed and yet give me at the vessel or cylinder containing the milk or cream, washed and cooled air.

Turning again to Fig. 6, $c^{12}$ represents what in my other application referred to is called the milk and air amalgamator it being entered by the air conducting pipe $D^4$ and by a milk conducting pipe m, the latter in practice being connected with some suitable source of supply for cooled milk.

It will be understood that the air forced into the milk is not warmed or heated air, and that in my method of making butter described it is never desired to evaporate any of the liquid substance in the vessel V, but rather the air introduced is always cool, moist air.

Having described my invention, what I claim, and desire to secure by Letters Patent, is—

1. In an apparatus for the treatment of milk or cream to produce butter, the following instrumentalities, viz:—a closed vessel to contain the milk or cream, a wash box, and a connecting pipe and blower to force air through said wash box and supply a continuous current of washed air to the interior of the said vessel, and into the milk or cream therein, a hollow perforated agitator in said vessel, and independent connections between said blower and hollow agitator, to introduce air throughout the body of milk or cream, substantially as described.

2. In an apparatus for the production of butter, a closed vessel to contain milk or cream; an agitator in said vessel a tank to receive ice; a blower to establish a continuous current of air through the said ice-tank; and in contact with the ice therein; and supply pipes intermediate the blower and the said vessel and ice tank and independent connections between said blower and agitator, substantially as described.

3. In an apparatus for the production of butter, a closed vessel to contain milk or cream and having a hollow perforated bottom: a perforated air distributing dasher movable in said vessel and connected to one end of a hollow piston rod: and an air collecting chamber in which the other end of said rod slides: combined with a blower, and connections between it and said chamber to force air thereinto and thence through the piston rod in a continuous current into all parts of the dasher and through its perforations into the milk or cream: an independent connection between the blower and hollow bottom of the closed vessel: an outlet for the spent or used air: and means to reciprocate the said piston rod and dasher, substantially as described.

4. In an apparatus for the production of butter, a wash-box; air distributing pipes therein; a blower to supply air continuously to the said pipes; a closed vessel to contain milk or cream; a series of headers and pipes connecting them with said wash-box, and with said closed vessel; combined with a cooling tank surrounding the header portions of said air pipe; and with a hollow piston-rod and hollow dasher through which air is forced into the milk or cream into the said vessel, and means to reciprocate said piston-rod and dasher to operate, substantially as described.

5. A vessel to contain milk or cream, the said vessel having a hollow perforated bottom; a hollow perforated dasher; a wash-box; pipes to connect the said bottom and the said dasher with the said wash-box; a blower; pipes to connect the said blower with the said wash-box; and means to actuate the blower and the dasher, whereby air supplied thereto by the blower and washed in the wash box is conducted into the said bottom and the said dasher and thence into the milk or cream in the vessel, to operate, substantially as described.

6. A vessel to contain milk or cream, it having a perforated hollow bottom; a perforated hollow dasher; a wash box; a blower; and an ice-tank; and means to actuate the said blower and the said dasher; combined with pipes to connect the said ice-tank with the said blower, the blower with the wash-box, and the wash-box with the said bottom, and the said dasher; whereby air cooled by direct contact with the ice in the ice-tank is driven by the blower through the wash-box, is washed therein and conducted through the said pipes, is delivered through the bottom, and dasher through the milk or cream in said vessel, substantially as described.

7. A cylinder or vessel to contain milk or cream; a wash-box; pipes to connect the said cylinder and wash-box; a perforated air distributing device forming the bottom of the said cylinder, and pipes between it and the said wash-box; and a series of spraying devices connected to said bottom and projecting up into the cylinder, and a hollow perforated dasher movable between the tops of said spraying devices and the air distributing device, combined with a blower to supply washed air to both the said dasher and the said air distributing device, substantially as described.

8. The method of producing butter from milk or cream, which consists in purifying filtered air by direct contact with ice, washing the air by passing it through a liquid, agitating the body of milk or cream, and simultaneously impregnating its mass with a continuous current of filtered air so purified and washed, substantially as described.

In testimony whereof I have signed my name to this specification in the presence of two subscribing witnesses.

GEORGE W. GRADER.

Witnesses:
 GEO. W. GREGORY,
 FRANCES M. NOBLE.